US010863569B2

(12) United States Patent
Zhang et al.

(10) Patent No.: US 10,863,569 B2
(45) Date of Patent: Dec. 8, 2020

(54) RRC CONNECTION RE-ESTABLISHMENT METHOD FOR DATA TRANSMISSION

(71) Applicant: HUAWEI TECHNOLOGIES CO., LTD., Shenzhen (CN)

(72) Inventors: Hongping Zhang, Shanghai (CN); Qufang Huang, Shanghai (CN); Le Yan, Shanghai (CN); Mingzeng Dai, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/151,109

(22) Filed: Oct. 3, 2018

(65) Prior Publication Data

US 2019/0037630 A1 Jan. 31, 2019

Related U.S. Application Data

(63) Continuation of application No. PCT/CN2016/078654, filed on Apr. 7, 2016.

(51) Int. Cl.
*H04W 76/19* (2018.01)
*H04W 36/30* (2009.01)
(Continued)

(52) U.S. Cl.
CPC ....... *H04W 76/19* (2018.02); *H04W 36/0069* (2018.08); *H04W 36/305* (2018.08);
(Continued)

(58) Field of Classification Search
CPC ..... H04W 76/19; H04W 76/27; H04W 76/11; H04W 76/18; H04W 88/16;
(Continued)

(56) References Cited

U.S. PATENT DOCUMENTS 6,917,807 B1* 7/2005 Vialen .................. H04W 48/20
455/435.2
2010/0130205 A1* 5/2010 Jung ................. H04W 36/0066
455/435.2
(Continued)

FOREIGN PATENT DOCUMENTS

CN 102625417 A 8/2012
CN 103582163 A 2/2014
(Continued)

OTHER PUBLICATIONS

3GPP TS 36.300 V12.8.0 (Dec. 2015), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2(Release 12), Dec. 2015, 254 pages.
(Continued)

*Primary Examiner* — Warner Wong
(74) *Attorney, Agent, or Firm* — Womble Bond Dickinson (US) LLP

(57) ABSTRACT

Embodiments of the present disclosure provide a data transmission method, user equipment, and an access network device. UE transmits air interface data to an access network device by using a serving cell set including at least two core serving cells that can independently serve the UE to transmit data, and initiates an RRC connection re-establishment process to the access network device only when detecting that all core serving cells in the serving cell set are unavailable. Data transmission is performed by using an available serving cell to the greatest extent. In other words, data transmission can be performed by using any available core serving cell, to reduce the dependence of data transmission between serving cells and minimize possibility of data
(Continued)

transmission interruption, thereby improving data transmission robustness.

16 Claims, 10 Drawing Sheets

(51) Int. Cl.
*H04W 36/00* (2009.01)
*H04W 76/18* (2018.01)
*H04W 76/11* (2018.01)
*H04W 76/27* (2018.01)
*H04W 72/04* (2009.01)
*H04W 88/16* (2009.01)
*H04L 5/00* (2006.01)

(52) U.S. Cl.
CPC ........ *H04W 72/0413* (2013.01); *H04W 76/11* (2018.02); *H04W 76/18* (2018.02); *H04W 76/27* (2018.02); *H04W 88/16* (2013.01); *H04L 5/001* (2013.01)

(58) Field of Classification Search
CPC ............. H04W 72/0413; H04W 36/00; H04W 36/0069; H04W 36/00837; H04W 36/04; H04W 36/06; H04W 36/14; H04W 36/22; H04W 36/24; H04W 36/305; H04W 36/34; H04W 16/00; H04W 40/34; H04W 40/36; H04L 5/0035; H04L 67/148; H04L 67/2814; H04L 12/5691; H04L 29/08738
See application file for complete search history.

(56) References Cited

U.S. PATENT DOCUMENTS

| | | | | |
|---|---|---|---|---|
| 2010/0159928 | A1* | 6/2010 | Wu | H04W 48/16 455/435.2 |
| 2012/0142361 | A1 | 6/2012 | Zhao et al. | |
| 2012/0281548 | A1 | 11/2012 | Lin et al. | |
| 2013/0148535 | A1* | 6/2013 | Baghel | H04L 1/0026 370/252 |
| 2013/0259003 | A1* | 10/2013 | Kwon | H04W 76/19 370/331 |
| 2014/0086127 | A1* | 3/2014 | Kim | H04L 5/0035 370/311 |
| 2014/0349713 | A1 | 11/2014 | Yamada | |
| 2015/0124743 | A1 | 5/2015 | Damnjanovic et al. | |
| 2015/0181479 | A1* | 6/2015 | Lin | H04W 24/04 370/331 |
| 2015/0373559 | A1* | 12/2015 | Hong | H04W 52/0206 370/329 |
| 2016/0088613 | A1 | 3/2016 | Li et al. | |
| 2016/0095004 | A1* | 3/2016 | Tseng | H04W 76/15 370/228 |
| 2016/0183321 | A1* | 6/2016 | Wen | H04W 76/18 370/329 |
| 2016/0302256 | A1* | 10/2016 | Susitaival | H04W 76/25 |
| 2017/0085452 | A1* | 3/2017 | Kato | H04W 76/18 |
| 2017/0134297 | A1* | 5/2017 | Johansson | H04L 1/16 |
| 2017/0265242 | A1* | 9/2017 | Yang | H04W 76/15 |
| 2017/0318504 | A1* | 11/2017 | Zhang | H04W 36/0066 |
| 2018/0146410 | A1* | 5/2018 | Cho | H04W 36/0061 |
| 2018/0302945 | A1* | 10/2018 | Kwon | H04L 5/0098 |
| 2020/0169899 | A1* | 5/2020 | Xiao | H04W 76/27 |

FOREIGN PATENT DOCUMENTS

| | | |
|---|---|---|
| CN | 104396296 A | 3/2015 |
| CN | 105122863 A | 12/2015 |
| WO | 2010105148 A1 | 9/2010 |

OTHER PUBLICATIONS

ZTE: "Radio link failure trigger in a carrier aggregation", 3GPP TSG RAN WG2 #67, R2-094705, Shenzhen, China, Aug. 2009, 2 pages, XP 50352770A.

ZTE: "RLF and Re-establishment in carrier aggregation", 3GPP TSG RAN WG2 #67bis, R2-095669, Oct. 12-16, Miyazaki, Japan, 4 pages, XP 50390181A.

* cited by examiner

RRC CONNECTION RE-ESTABLISHMENT METHOD FOR DATA TRANSMISSION

CROSS-REFERENCE TO RELATED APPLICATIONS

This application is a continuation of International Application No. PCT/CN2016/078654, filed on Apr. 7, 2016, the disclosure of which is hereby incorporated by reference in its entirety.

TECHNICAL FIELD

Embodiments of the present disclosure relate to communications technologies, and in particular, to a data transmission method, user equipment, and an access network device.

BACKGROUND

A carrier aggregation (CA) technology is introduced to LTE-Advanced (LTE-A) to maintain long-term competitive advantages of the 3rd Generation Partnership Project (3GPP) and further improve spectral efficiency and a user throughput of a system. In this technology, user equipment (UE) performs uplink and downlink communication by simultaneously using a plurality of cells. One of the plurality of cells is a master cell (PCell), and another is a secondary cell (SCell).

Generally, CA may be classified into intra-base station cell aggregation, inter-base station cell aggregation, and the like. The intra-base station cell aggregation means that for one UE, aggregated serving cells belong to one base station. The inter-base station cell aggregation means that aggregated serving cells belong to a plurality of different base stations (only two base stations are supported in a current standard protocol). A serving base station that serves the PCell is a master eNodeB (Master eNB, MeNB), another serving base station is a secondary eNodeB (SeNB), and one cell in one or more SCells of the secondary eNodeB is a primary secondary cell (PSCell). In a CA scenario, when a radio link failure (RLF) occurs, for example, when an RLF occurs in the master cell, the UE initiates a radio resource control RRC) connection re-establishment process.

In the foregoing process, data transmissions of all serving cells are seriously dependent. When an RLF occurs in the master cell, the UE needs to initiate an RRC connection re-establishment process even if a serving cell with good signal quality exists on the master eNodeB or the secondary eNodeB. This causes interruption of data transmission of all services of the user.

SUMMARY

Embodiments of the present disclosure provide a data transmission method, user equipment, and an access network device, to reduce data transmission dependence between serving cells by using an available serving cell to the greatest extent and minimize possibility of data transmission interruption, thereby improving data transmission robustness.

According to a first aspect, an embodiment of the present disclosure provides a data transmission method, including:
transmitting, by UE, air interface data to an access network device by using a serving cell set including at least two core serving cells that can independently serve the UE to transmit data, and initiating an RRC connection re-establishment process to the access network device only when all core serving cells in the serving cell set are unavailable.

According to the data transmission method provided in this embodiment of the present disclosure, the user equipment transmits the air interface data by using the serving cell set, where the serving cell set includes at least two core serving cells, and the core serving cell is a cell configured to independently serve the UE to transmit the air interface data; and the UE initiates the RRC connection re-establishment process to the access network device only when detecting that all the core serving cells in the serving cell set are unavailable. Data transmission is performed by using an available serving cell to the greatest extent. In other words, data transmission can be performed by using any available core serving cell, to reduce the dependence of data transmission between serving cells and minimize possibility of data transmission interruption, thereby improving data transmission robustness.

In a possible design, the serving cell set is provided by at least one access network device.

In a possible design, the method further includes: receiving, by the UE, a first message that is sent by an access network device and that is used to add a first cell as a core serving cell; and
adding, by the UE, the first cell to the serving cell set.

In a possible design, the first message carries first indication information, and the first indication information is used to indicate that the first cell is a core serving cell, and in this case, the access network device may explicitly instruct the UE to add the first cell as a core serving cell; or
the first message carries a core serving cell parameter, and in this case, the access network device may instruct the UE to add the first cell as a core serving cell.

In a possible design, the core serving cell parameter includes physical uplink control channel (PUCCH) configuration information.

By using the foregoing possible design, a core serving cell may be flexibly added to the serving cell set.

In a possible design, the method further includes: sending, by the UE, a core serving cell unavailability message to the access network device when the first core serving cell in the serving cell set is unavailable, where the core serving cell unavailability message is used to indicate that the first core serving cell is unavailable; and
that the first core serving cell is unavailable includes the following cases:
a radio link failure (RLF) occurs in the first core serving cell; or
a quantity of radio link control (RLC) retransmissions of the first core serving cell reaches a maximum value.

In a possible design, the core serving cell unavailability message carries a cell identity of the first core serving cell and/or a cause value for unavailability of the first core serving cell.

By using the foregoing possible design, a core serving cell may be flexibly deleted from the serving cell set.

In a possible design, the method further includes:
receiving, by the UE, a second message that is sent by an access network device and that is used to add a second cell as a non-core serving cell, where the second message carries a cell identity of a second core serving cell in the serving cell set, and is used to instruct to associate the second cell with the second core serving cell; and
adding, by the UE, the second cell as a non-core serving cell, and associating the second cell with the second core serving cell.

By using the foregoing method, a non-core serving cell may be added flexibly.

According to another aspect, an embodiment of the present disclosure provides a data transmission method, including:

receiving, by an access network device, a data packet of a data radio bearer by using any serving cell in a serving cell set, and decrypting the data packet and sending the decrypted data packet to a serving gateway after determining that the access network device is a data anchor of the data radio bearer; or determining a data anchor associated with the data radio bearer and sending the data packet to the data anchor if the access network device determines that the access network device is not the data anchor associated with the data radio bearer.

According to the data transmission method provided in this embodiment of the present disclosure, the access network device receives the data packet of the data radio bearer by using any serving cell in the serving cell set, and decrypts the data packet and sends the decrypted data packet to the serving gateway after determining that the access network device is the data anchor of the data radio bearer; or determines the data anchor associated with the data radio bearer and sends the data packet to the data anchor if the access network device determines that the access network device is not the data anchor associated with the data radio bearer. Data transmission is performed by using an available serving cell to the greatest extent. In other words, data transmission can be performed by using any available core serving cell, to reduce the dependence of data transmission between serving cells and minimize possibility of data transmission interruption, thereby improving data transmission robustness.

In a possible design, before the determining, by the access network device, whether the access network device is the data anchor associated with the data radio bearer, the method further includes:

receiving, by the access network device, a fifth message that is sent by a signaling anchor or the data anchor associated with the data radio bearer and that is used to add the data radio bearer, where the fifth message carries information about the data anchor associated with the data radio bearer.

In a possible design, the fifth message further carries quality of service (QoS) information of the data radio bearer.

In a possible design, if the fifth message is specifically sent by the signaling anchor and the information about the data anchor indicates that the access network device is the data anchor, the fifth message further carries a security key of the data anchor; and the method further includes:

processing, by the access network device, the data packet of the data radio bearer by using the security key of the data anchor.

In a possible design, the security key of the data anchor is derived from a security key of the signaling anchor by the signaling anchor.

In a possible design, the receiving, by an access network device, a data packet that is of a data radio bearer and that is sent by user equipment UE by using any serving cell in a serving cell set includes:

when the security key of the signaling anchor changes, performing, by the access network device, data transmission with the UE by still using security key information of the data anchor.

In a possible design, the method further includes:

receiving, by the access network device, a data packet that is of a signaling radio bearer and that is sent by the UE by using any serving cell in the serving cell set;

determining, by the access network device, whether the access network device is a signaling anchor; and decrypting the data packet and processing a radio resource control RRC message in the data packet if the access network device determines that the access network device is the signaling anchor; or sending the data packet to the signaling anchor if the access network device determines that the access network device is not the signaling anchor.

According to still another aspect, an embodiment of the present disclosure provides user equipment, including:

a transceiver module, configured to transmit air interface data by using a serving cell set, where the serving cell set includes at least two core serving cells, and the core serving cell is a cell configured to independently serve the UE to transmit the air interface data; and the transceiver module is further configured to initiate a radio resource control RRC connection re-establishment process when all core serving cells in the serving cell set are unavailable.

In a possible design, the serving cell set is provided by at least one access network device.

In a possible design, the foregoing device further includes a processing module; where the transceiver module is configured to receive a first message that is sent by an access network device and that is used to add a first cell as a core serving cell; and the processing module is configured to add the first cell to the serving cell set.

In a possible design, the first message carries first indication information, and the first indication information is used to indicate that the first cell is a core serving cell; or the first message carries a core serving cell parameter.

In a possible design, the core serving cell parameter includes physical uplink control channel (PUCCH) configuration information.

In a possible design, the transceiver module is further configured to send a core serving cell unavailability message to the access network device when the first core serving cell in the serving cell set is unavailable, where the core serving cell unavailability message is used to indicate that the first core serving cell is unavailable; and that the first core serving cell is unavailable includes the following cases:

A radio link failure (RLF) occurs in the first core serving cell; or a quantity of radio link control (RLC) retransmissions of the first core serving cell reaches a maximum value.

In a possible design, the core serving cell unavailability message carries a cell identity of the first core serving cell and/or a cause value for unavailability of the first core serving cell.

In a possible design, the foregoing device further includes a processing module; where the transceiver module is further configured to receive a second message that is sent by an access network device and that is used to add a second cell as a non-core serving cell, where the second message carries a cell identity of a second core serving cell in the serving cell set, and is used to instruct to associate the second cell with the second core serving cell; and the processing module is configured to add the second cell as a non-core serving cell, and associate the second cell with the second core serving cell.

According to still another aspect, an embodiment of the present disclosure provides an access network device, including:

a transceiver module, configured to receive a data packet that is of a data radio bearer and that is sent by user equipment UE by using any serving cell in a serving cell set; and a processing module, configured to: determine whether the access network device is a data anchor associated with the data radio bearer; and decrypt the data packet and send the decrypted data to a serving gateway if it is determined that the access network device is the data anchor associated with the data radio bearer; or determine a data anchor associated with the data radio bearer and send the data packet to the data anchor if it is determined that the access network device is not the data anchor associated with the data radio bearer.

In a possible design, before the processing module determines whether the processing module is the data anchor associated with the data radio bearer, the transceiver module is further configured to receive a fifth message that is sent by a signaling anchor or the data anchor associated with the data radio bearer and that is used to add the data radio bearer, where the fifth message carries information about the data anchor associated with the data radio bearer.

In a possible design, the fifth message further carries quality of service (QoS) information of the data radio bearer.

In a possible design, if the fifth message is specifically sent by the signaling anchor and the information about the data anchor indicates that the access network device is the data anchor, the fifth message further carries a security key of the data anchor; and the processing module is further configured to process the data packet of the data radio bearer by using the security key of the data anchor.

In a possible design, the security key of the data anchor is derived from a security key of the signaling anchor by the signaling anchor.

In a possible design, the transceiver module is specifically configured to: when the security key of the signaling anchor changes, perform data transmission with the UE by still using security key information of the data anchor.

In a possible design, the transceiver module is further configured to receive a data packet that is of a signaling radio bearer and that is sent by the UE by using any serving cell in the serving cell set; and the processing module is further configured to: determine whether the processing module is a signaling anchor; and decrypt the data packet and process a radio resource control RRC message in the data packet if it is determined that the processing module is the signaling anchor; or send the data packet to the signaling anchor if it is determined that the access network device is not the signaling anchor.

According to still another aspect, an embodiment of the present disclosure provides user equipment, including:

a transceiver, configured to transmit air interface data by using a serving cell set, where the serving cell set includes at least two core serving cells, and the core serving cell is a cell configured to independently serve the UE to transmit the air interface data; and the transceiver is further configured to initiate a radio resource control RRC connection re-establishment process when all core serving cells in the serving cell set are unavailable.

In a possible design, the serving cell set is provided by at least one access network device.

In a possible design, the foregoing device further includes a processor; where the transceiver is configured to receive a first message that is sent by an access network device and that is used to add a first cell as a core serving cell; and the processor is configured to add the first cell to the serving cell set.

In a possible design, the first message carries first indication information, and the first indication information is used to indicate that the first cell is a core serving cell; or the first message carries a core serving cell parameter.

In a possible design, the core serving cell parameter includes physical uplink control channel (PUCCH) configuration information.

In a possible design, the transceiver is further configured to send a core serving cell unavailability message to the access network device when the first core serving cell in the serving cell set is unavailable, where the core serving cell unavailability message is used to indicate that the first core serving cell is unavailable; and that the first core serving cell is unavailable includes the following cases:

A radio link failure (RLF) occurs in the first core serving cell; or a quantity of radio link control (RLC) retransmissions of the first core serving cell reaches a maximum value.

In a possible design, the core serving cell unavailability message carries a cell identity of the first core serving cell and/or a cause value for unavailability of the first core serving cell.

In a possible design, the foregoing device further includes a processor;

the transceiver is further configured to receive a second message that is sent by an access network device and that is used to add a second cell as a non-core serving cell, where the second message carries a cell identity of a second core serving cell in the serving cell set, and is used to instruct to associate the second cell with the second core serving cell; and the processor is configured to add the second cell as a non-core serving cell, and associate the second cell with the second core serving cell.

According to still another aspect, an embodiment of the present disclosure provides an access network device, including:

a transceiver, configured to receive a data packet that is of a data radio bearer and that is sent by user equipment UE by using any serving cell in a serving cell set; and a processor, configured to: determine whether the access network device is a data anchor associated with the data radio bearer; and decrypt the data packet and send the decrypted data to a serving gateway if it is determined that the access network device is the data anchor associated with the data radio bearer; or determine a data anchor associated with the data radio bearer and send the data packet to the data anchor if it is determined that the access network device is not the data anchor associated with the data radio bearer.

In a possible design, before the processor determines whether the processor is the data anchor associated with the data radio bearer, the transceiver is further configured to receive a fifth message that is sent by a signaling anchor or the data anchor associated with the data radio bearer and that is used to add the data radio bearer, where the fifth message carries information about the data anchor associated with the data radio bearer.

In a possible design, the fifth message further carries quality of service (QoS) information of the data radio bearer.

In a possible design, if the fifth message is specifically sent by the signaling anchor and the information about the data anchor indicates that the access network device is the data anchor, the fifth message further carries a security key of the data anchor; and the processor is further configured to process the data packet of the data radio bearer by using the security key of the data anchor.

In a possible design, the security key of the data anchor is derived from a security key of the signaling anchor by the signaling anchor.

In a possible design, the transceiver is specifically configured to: when the security key of the signaling anchor changes, perform data transmission with the UE by still using security key information of the data anchor.

In a possible design, the transceiver is further configured to receive a data packet that is of a signaling radio bearer and that is sent by the UE by using any serving cell in the serving cell set; and the processor is further configured to: determine whether the processor is a signaling anchor; and decrypt the data packet and process a radio resource control RRC message in the data packet if it is determined that the processor is the signaling anchor; or send the data packet to the signaling anchor if it is determined that the access network device is not the signaling anchor.

According to still another aspect, an embodiment of the present disclosure provides a data transmission method, including:

receiving, by an access network device, air interface data sent by user equipment UE by using a serving cell set, where the serving cell set includes at least two core serving cells, and the core serving cell is a cell configured to independently serve the UE to transmit the air interface data; and receiving, by the access network device, a radio resource control RRC connection re-establishment process initiated by the UE when all core serving cells in the serving cell set are unavailable.

In a possible design, the serving cell set is provided by at least one access network device.

In a possible design, the method further includes:
sending, by the access network device to the UE, a first message that is used to add a first cell as a core serving cell, so that the UE adds the first cell to the serving cell set.

In a possible design, the first message carries first indication information, and the first indication information is used to indicate that the first cell is a core serving cell; or the first message carries a core serving cell parameter.

In a possible design, the core serving cell parameter includes physical uplink control channel (PUCCH) configuration information.

In a possible design, the method further includes: receiving, by the access network device, a core serving cell unavailability message sent by the UE when a first core serving cell in the serving cell set is unavailable, where the core serving cell unavailability message is used to indicate that the first core serving cell is unavailable; and that the first core serving cell is unavailable includes the following cases: A radio link failure (RLF) occurs in the first core serving cell; or a quantity of radio link control (RLC) retransmissions of the first core serving cell reaches a maximum value.

In a possible design, the core serving cell unavailability message carries a cell identity of the first core serving cell; and/or a cause value for unavailability of the first core serving cell.

In a possible design, the method further includes:
sending, by the access network device to the UE, a second message that is used to add a second cell as a non-core serving cell, where the second message carries a cell identity of a second core serving cell in the serving cell set, and is used to instruct to associate the second cell with the second core serving cell; so that the UE adds the second cell as a non-core serving cell and associates the second cell with the second core serving cell.

According to still another aspect, an embodiment of the present disclosure provides user equipment, and the user equipment has a function of implementing an action of the first user equipment in the foregoing method designs. The function may be implemented by hardware, or may be implemented by hardware by executing corresponding software. The hardware or the software includes one or more units corresponding to the foregoing function.

In a possible design, a structure of the user equipment includes a processor and a transmitter. The processor is configured to support the first user equipment in performing a corresponding function in the foregoing method. The transmitter is configured to: support communication between the user equipment and an access network device, and send information or an instruction used in the foregoing method to the access network device. The user equipment may further include a memory. The memory is configured to be coupled to the processor, and the memory stores a program instruction and data that are necessary for the user equipment.

According to still another aspect, an embodiment of the present disclosure provides an access network device, and the access network device has a function of implementing an action of the access network device in the foregoing method design. The function may be implemented by hardware, or may be implemented by hardware by executing corresponding software. The hardware or the software includes one or more units corresponding to the foregoing function. The module may be software and/or hardware.

In a possible design, a structure of the access network device includes a receiver and a processor. The processor is configured to support the access network device in performing a corresponding function in the foregoing method. The transmitter is configured to: support communication between the access network device and user equipment and receive information or an instruction that is used in the foregoing method and that is sent by the user equipment. The access network device may further include a memory. The memory is configured to be coupled to the processor, and the memory stores a program instruction and data that are necessary for the user equipment.

According to still another aspect, an embodiment of the present disclosure provides a communications system, and the system includes the user equipment and the access network device described in the foregoing aspects.

In still another aspect, an embodiment of the present disclosure provides a computer storage medium, and the computer storage medium is configured to store a computer software instruction used by the foregoing user equipment, and includes a program designed to execute the foregoing aspects.

According to a further aspect, an embodiment of the present disclosure provides a computer storage medium, and the computer storage medium is configured to store a computer software instruction used by the foregoing access network device, and includes a program designed to execute the foregoing aspects.

According to still another aspect, an embodiment of the present disclosure provides a chip system, including at least one processor, a memory, an input/output part, and a bus. The at least one processor is configured to obtain an instruction in the memory by using the bus, to implement a design function of the user equipment in the foregoing method design.

According to still another aspect, an embodiment of the present disclosure provides a chip system, including at least one processor, a memory, an input/output part, and a bus. The at least one processor is configured to obtain an instruction in the memory by using the bus, to implement a design function of the access network device in the foregoing method design.

The embodiments of the present disclosure provide the data transmission method, the user equipment, and the access network device. The UE transmits air interface data to the access network device by using the serving cell set including at least two core serving cells that can independently serve the UE to transmit data, and initiates an RRC connection re-establishment process to the access network device only when detecting that all core serving cells in the serving cell set are unavailable. Data transmission is performed by using an available serving cell to the greatest extent. In other words, data transmission can be performed by using any available core serving cell, to reduce the dependence of data transmission between serving cells and minimize possibility of data transmission interruption, thereby improving data transmission robustness.

DESCRIPTION OF EMBODIMENTS

Figure 1:
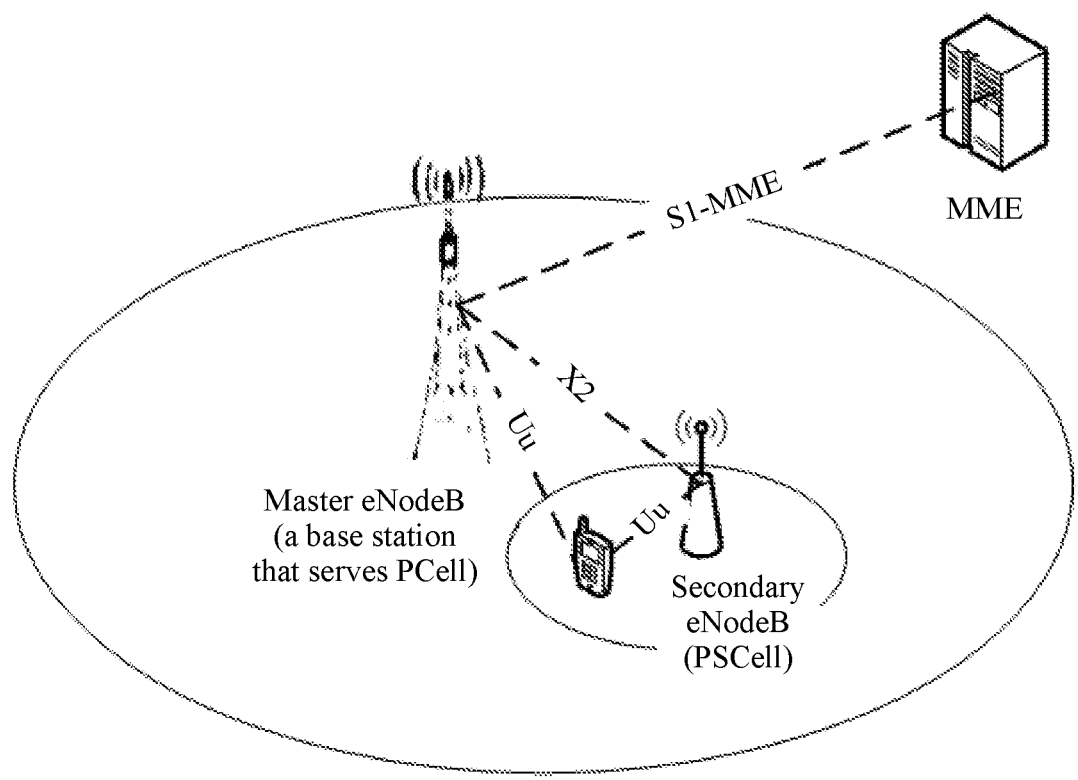
FIG. 1 is a schematic diagram of a current inter-base station cell aggregation system.

FIG. 1 is a schematic diagram of a current inter-base station cell aggregation system. As shown in FIG. 1, UE uses both a cell served by a master eNodeB and a cell served by a secondary eNodeB to perform uplink and downlink communication. A serving base station that serves a PCell is a master eNodeB, and one cell in one or more SCells served by the secondary eNodeB is a PSCell. The master eNodeB communicates with a mobility management entity (Mobility Management Entity, MME) based on an S1-MME interface protocol. The master eNodeB communicates with the secondary eNodeB based on an X2 interface protocol. The master eNodeB and the secondary eNodeB communicate with the UE based on a Uu interface.

Generally, in an inter-base station cell aggregation scenario, an RLF occurs in the following four main scenarios: 1. That an RLF occurs in a PCell is detected on a physical layer of the UE; 2. A quantity of RLC retransmissions of a master eNodeB corresponding to the UE reaches a maximum value; 3. That an RLF occurs in a PSCell is detected on a physical layer of the UE; 4. A quantity of RLC retransmissions of a secondary eNodeB corresponding to the UE reaches a maximum value. However, in an intra-base station cell aggregation scenario, an RLF occurs in the scenario 1 and the scenario 2. In the prior art, in the scenario 1 and the scenario 2, the UE considers that an RLF occurs in the master eNodeB, and initiates an RRC connection re-establishment process, resulting in interrupted transmission of all service data of the UE. In the scenario 3 and the scenario 4, the UE considers that an RLF occurs in the secondary eNodeB, and the UE stops bearer data transmission in all serving cells served by the secondary eNodeB, and reports secondary eNodeB failure information to the network.

According to the foregoing description, in a CA scenario, data transmission of UE depends heavily on a PCell and a PSCell, and in particular, the PCell. Specifically, when an RLF occurs in the PCell or a quantity of RLC layer retransmissions of the master eNodeB reaches a maximum value, the UE initiates an RRC re-establishment process even if a serving cell with good signal quality exists in the master eNodeB or the secondary eNodeB, resulting in interrupted transmission of all service data of the UE. However, when an RLF occurs in the PSCell of the secondary eNodeB or a quantity of RLC layer retransmissions of the secondary eNodeB reaches a maximum value, none of serving cells served by the secondary eNodeB can perform data transmission even if a serving cell with good signal quality exists in the secondary eNodeB, resulting in interruption of data transmission of a bearer associated with the secondary eNodeB. In addition, when the PCell switches, for example, when PCell signal strength is lower and the PCell needs to be switched to a cell with relatively high signal strength, a handover process needs to be performed, and all serving cells stop sending data during the handover process, resulting in interruption of transmission of all service data of the UE.

In view of this, the present disclosure provides a data transmission method, user equipment, and an access network device, to reduce data transmission dependence between serving cells by using an available serving cell to the greatest extent and minimize possibility of data transmission interruption, thereby improving data transmission robustness.

Technologies described in this specification may be applied to various communications systems, for example, current 2G and 3G communications systems and a next-generation communications system, for example, a Global System for Mobile Communications (GSM), a Code Division Multiple Access (CDMA) system, a Time Division Multiple Access (TDMA) system, a Wideband Code Division Multiple Access (WCDMA) system, a Frequency Division Multiple Access (FDMA) system, an Orthogonal Frequency-Division Multiple Access (OFDMA) system, a single-carrier FDMA (SC-FDMA) system, a General Packet Radio Service (GPRS) system, a Long Term Evolution (LTE) system, an E-UTRA system, a 5G mobile communications system, and another similar communications system.

A terminal used in this application may be a wired terminal or a wireless terminal. The wireless terminal may refer to a device that provides a user with voice and/or data connectivity, a handheld device with a radio connection function, or another processing device connected to a wireless modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile terminal (Mobile), a remote station, a remote terminal, an access terminal, a user terminal, a user agent, a user device, or user equipment.

The access network device used in this application may be a base station, an access point (AP), or the like. The base station may be a device that communicates with a wireless terminal over an air interface in an access network by using one or more sectors. The base station may be configured to mutually convert a received over-the-air frame and an IP packet and serve as a router between the wireless terminal and a rest portion of the access network, where the rest portion of the access network may include an Internet protocol (IP) network. The base station may coordinate attribute management of the air interface. For example, the base station may be a base transceiver station (BTS) in GSM or CDMA, may also be a base station (NodeB) in WCDMA, or may further be an evolved NodeB (NodeB, eNB, or e-NodeB) in LTE, or a 5G base station, and is not limited in this application.

The data transmission method provided in this embodiment of the present disclosure is applicable to intra-base station cell aggregation, inter-base station cell aggregation, and inter-cell aggregation between different wireless access systems. For ease of description and for clarity, that a system architecture is specifically an LTE system and a base station is an eNB is used as an example below to describe the technical solutions of the present disclosure in detail. Specifically, refer to FIG. 2.

Figure 2:
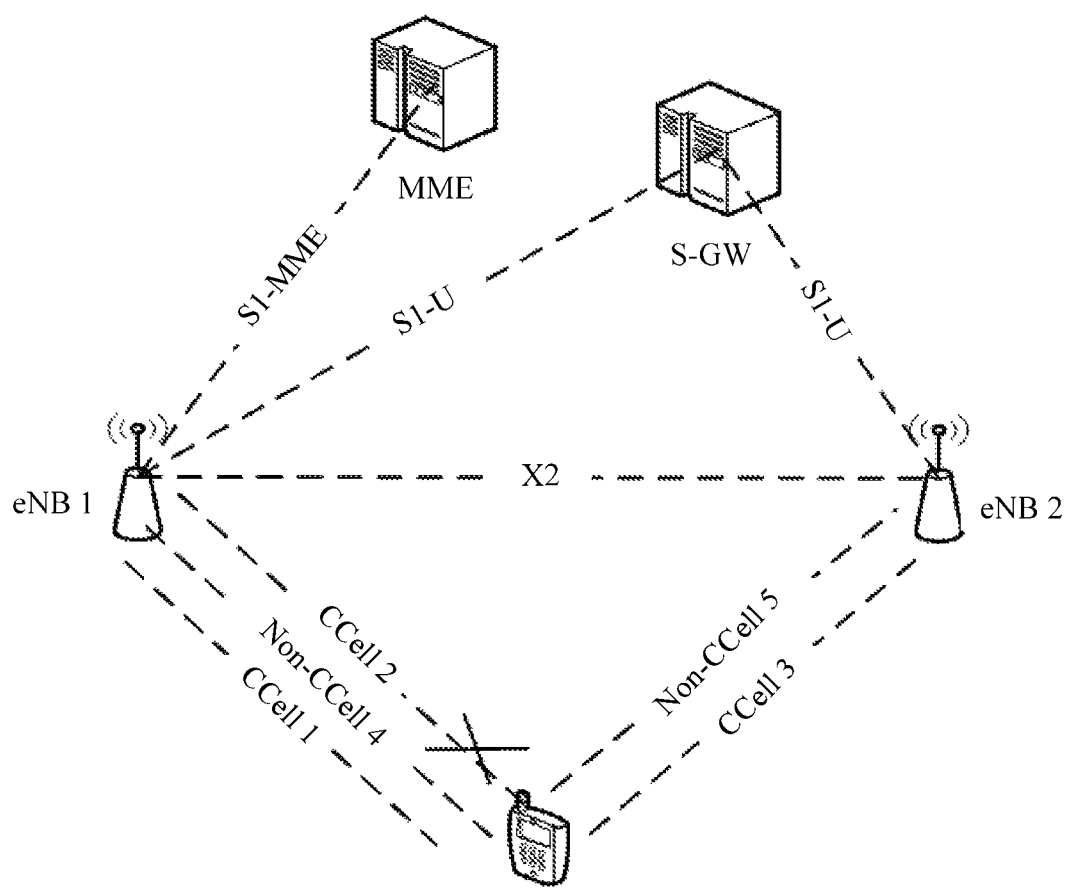
FIG. 2 is a schematic structural diagram of a wireless communications system applied to a data transmission method according to one embodiment of the present disclosure.

FIG. 2 is a schematic structural diagram of a wireless communications system applied to a data transmission method according to one embodiment of the present disclosure. As shown in FIG. 2, in an embodiment of the present disclosure, a base station communicates with an MME based on an S1-MME interface protocol. The base station communicates with a serving gateway (S-GW) based on an S1-U interface protocol. The base station communicates with another base station based on an X2 interface protocol, and UE transmits air interface data to an access network device, namely, an eNB, by using a serving cell set. The serving cell set includes at least two core serving cells (CCell) configured to independently serve the UE to transmit data. These core serving cells may belong to one eNB, or may belong to different eNBs. For example, both a CCell 1 and a CCell 2 belong to an eNB1, and a CCell 3 belongs to an eNB2. Optionally, the serving cell set may further include some non-core serving cells (Non-CCell), namely, cells that cannot serve the UE independently and cannot serve the UE to transmit data without assistance of a CCell, for example, a non-CCell 4 and a non-CCell 5 shown in the figure. The following describes the data transmission method of the present disclosure in detail based on FIG. 2. Specifically, refer to FIG. 3.

Figure 3:
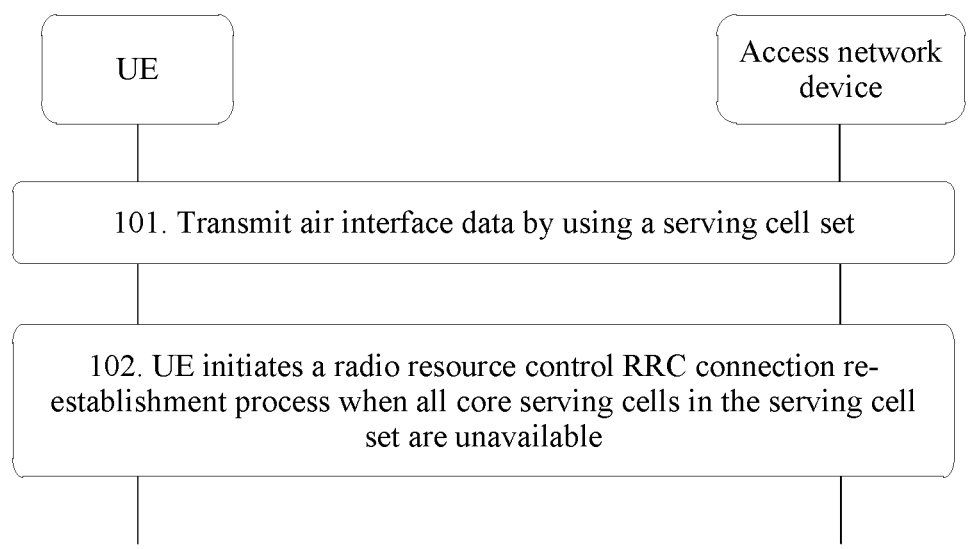
FIG. 3 is a signaling diagram of a data transmission method according to one embodiment of the present disclosure.

FIG. 3 is a signaling diagram of a data transmission method according to one embodiment of the present disclosure. In this embodiment, an access network device interacts with a terminal. This is applicable to a CA scenario. Specifically, this embodiment includes the following steps.

101. User equipment UE transmits air interface data by using a serving cell set, where the serving cell set includes at least two core serving cells, and the core serving cell is a cell configured to independently serve the UE to transmit the air interface data.

In this embodiment of the present disclosure, a CCell concept is introduced, and CCell is characterized as a serving cell that can independently serve the UE to perform uplink and downlink data transmission without help from another serving cell. Features of the CCell are as follows: The CCell is configured with PUCCH resources and can schedule at least resources of the CCell, and CCells do not affect each other, and are independent of each other. In this step, there may be one or more access network devices that provide the serving cell in the serving cell set. Correspondingly, when transmitting the air interface data by using the serving cell set, the UE may transmit the air interface data to any access network device that provides the serving cell set. For example, referring to FIG. 2, the UE may transmit the air interface data to an eNB1 by using the serving cell set, or may transmit the air interface data to an eNB2 by using the serving cell set. Certainly, the UE may simultaneously transmit the air interface data to the eNB1 and the eNB2. One access network device may be served by one or more CCells, and the UE can properly transmit the air interface data only when at least one core serving cell in the serving cell set is available.

102. The UE initiates a radio resource control RRC connection re-establishment process when all core serving cells in the serving cell set are unavailable.

In this embodiment of the present disclosure, whether a core serving cell is available may be determined by determining whether an RLF occurs in the core serving cell or whether a quantity of RLC retransmissions of the core serving cell reaches a maximum value. Generally, if an RLF occurs in a core serving cell, or if a quantity of RLC retransmissions of a core serving cell reaches a maximum value, it indicates that the core serving cell is unavailable.

In this step, if all the core serving cells in the serving cell set are unavailable, an RRC connection re-establishment is initiated to the access network device. For example, referring to FIG. 2, when a CCell 1, a CCell 2, and a CCell 3 are all unavailable, the UE initiates an RRC connection re-establishment process to the eNB1 or the eNB2. For example, when the CCell 2 is unavailable (represented by x in the figure), the UE transmits the air interface data to the access network device by using another CCell, for example, the CCell 1 or the CCell 3.

According to the data transmission method provided in this embodiment of the present disclosure, the UE transmits the air interface data to the access network device by using the serving cell set including the at least two core serving cells that can independently serve the UE to transmit data, and initiates the RRC connection re-establishment process to the access network device only when detecting that all the core serving cells in the serving cell set are unavailable. Data transmission is performed by using an available serving cell to the greatest extent. In other words, data transmission can be performed by using any available core serving cell, to reduce the dependence of data transmission between serving cells and minimize possibility of data transmission interruption, thereby improving data transmission robustness.

The following describes the present disclosure in detail from two aspects: a terminal side and a network side.

The first aspect is the terminal side. Specifically, addition of a CCell, a CCell unavailability processing mechanism, and a mobility mechanism are described in detail.

First, addition and deletion of a CCell are described.

Generally, a cell that is initially accessed by the UE entering a connected state is always a CCell. When a CCell is added, the access network device sends, to the UE, a first message for adding a first cell as a core serving cell. Correspondingly, the UE receives the message, and adds the first cell to the serving cell set. In a possible manner, the access network device explicitly instructs the UE to add the first cell as a CCell; and in this case, first indication information is used to indicate that the first cell is a CCell. In another possible manner, the access network device implicitly instructs the UE to add the first cell as a CCell; and in this case, first indication information is a unique core serving cell parameter of the CCell. If the first message received by the UE carries the core serving cell parameter, it indicates that the first cell is a CCell; of the first message received by the UE does not carry the core serving cell parameter, it indicates that the first cell is a non-CCell. The core serving cell parameter is, for example, physical uplink control channel (PUCCH) configuration information.

Further, in addition to the CCell, a non-CCell may further be added. When adding the non-CCell, the access network device sends, to the UE, a second message for adding the first cell as a non-core serving cell. The second message carries a cell identity of a second core serving cell in the serving cell set, and is used to instruct to associate the second cell with the second core serving cell. Correspondingly, the UE receives the second message, adds the second cell to the serving cell set, and associates the second cell with the second core serving cell. It should be noted that "association" herein means that the non-CCell performs data transmission with the assistance of a CCell. In other words, the non-CCell is associated with the CCell. Specifically, when adding the non-CCell to the UE, the access network device indicates the CCell associated with the non-CCell. When the CCell is unavailable, all non-CCells associated with the CCell are unavailable. In addition, optionally, one non-CCell may be associated with two or more CCells, and the non-CCell is unavailable only when the two or more CCells are all unavailable. Certainly, one non-CCell may be associated with no CCell or all CCells, and any CCell may help the non-CCell to perform data transmission. Preferably, one non-CCell and a CCell associated with the CCell belong to one access network device, to reduce implementation complexity.

In this embodiment of the present disclosure, a bearer including a data radio bearer and a signaling radio bearer is not associated with the access network device (for example, a base station) but is decoupled from the access network device. In other words, a master cell group (MCG) bearer, a secondary cell group (SCG) bearer, and a split bearer are no longer differentiated. Data carried by any bearer may be transmitted on any available serving cell or serving base station. In an optional solution, the bearer is associated with one or more CCells, and data transmission interruption occurs in the bearer only when all CCells associated with the bearer are unavailable. It should be noted that, in this embodiment of the present disclosure, a signaling radio bearer (SRB) may perform transmission in any serving cell but has only one entity (namely, a signaling anchor) for processing an RRC message, and a data radio bearer (DRB) may perform transmission in any serving cell but has only one corresponding data anchor.

Second, the CCell unavailability processing mechanism is described.

Figure 4:
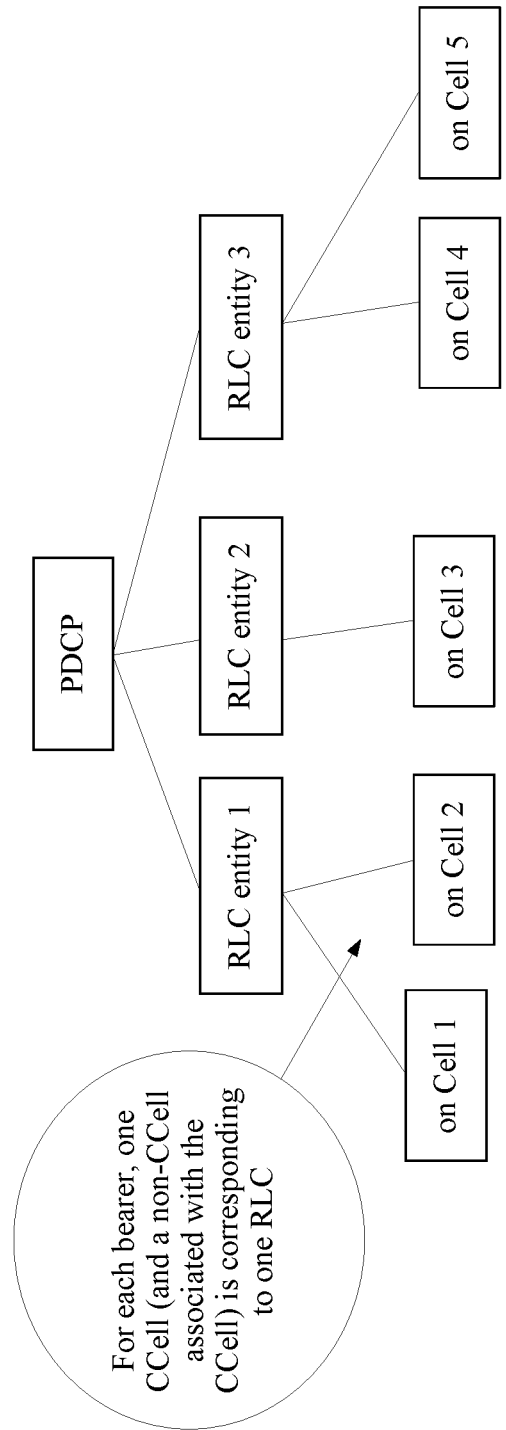
FIG. 4 is a schematic diagram of an RLC entity of a bearer in a data transmission method according to one embodiment of the present disclosure.

Generally, unavailability of a CCell means that an RLF occurs in the CCell, a quantity of RLC retransmissions corresponding to the CCell reaches a maximum value, or the like. The quantity of RLC retransmissions are specific to the CCell. In other words, data transmitted by the CCell (and a non-CCell associated with the CCell) can only be retransmitted by the CCell (and the non-CCell associated with the CCell) when RLC retransmission is required. In other words, when RLC retransmission is required, a serving cell is selected from the CCell and the non-CCell associated with the CCell for retransmission. When the CCell or the non-CCell associated with the CCell performs one RLC retransmission, the quantity of RLC retransmissions increases by 1. When the quantity of RLC retransmissions reaches the maximum value, the CCell and the non-CCell associated with the CCell are considered unavailable. In other words, for each data radio bearer, one CCell (and a non-CCell associated with the CCell) is corresponding to one RLC entity, and a quantity of CCells is equal to a quantity of RLC entities. Each RLC entity performs transmission by using one CCell and a non-CCell associated with the CCell. Specifically, referring to FIG. 4, FIG. 4 is a schematic diagram of an RLC entity of a bearer in a data transmission method according to one embodiment of the present disclosure. As shown in FIG. 4, the bearer includes three RLC entities. An RLC entity 1 performs transmission by using a Cell 1 and a Cell 2; for example, the Cell 1 is a CCell and the Cell 2 is associated with a non-CCell. An RLC entity 2 performs transmission by using a Cell 3; and the Cell 3 is a CCell and the Cell 3 is not associated with any non-CCell. An RLC entity 3 performs transmission by using a Cell 4 and a Cell 5; for example, the Cell 4 is a CCell and the Cell 5 is a non-CCell associated with the Cell 4.

In an optional embodiment, in addition to the maximum quantity of RLC retransmissions, a retransmission quantity threshold may be set. The threshold is less than the maximum quantity of RLC retransmissions, and when a quantity of retransmissions of a data packet being transmitted by the CCell and the non-CCell associated with the CCell exceeds the retransmission threshold, it indicates that channel conditions of the CCell and the non-CCell associated with the CCell are relatively poor. In this case, the UE concurrently transmits, by using another one or more CCells, the data packet being transmitted by the CCell and even a to-be-transmitted data packet in a cache, to minimize a data transmission delay. In this process, when the retransmission threshold is set to 0, it indicates that the data packet transmitted by using the CCell is always transmitted by using another CCell.

Figure 5:
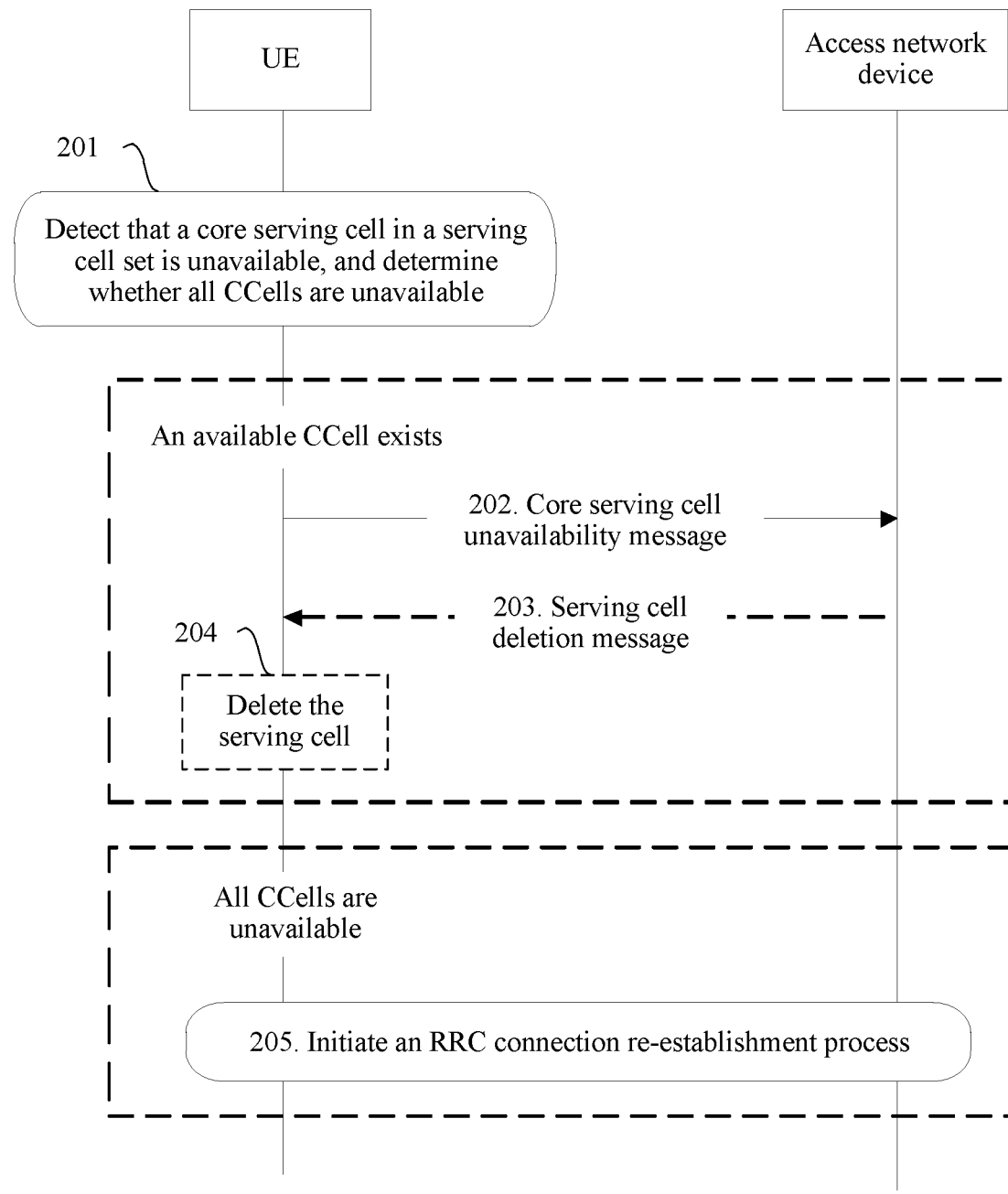
FIG. 5 is a schematic diagram of a first processing process in a data transmission method when a serving cell is unavailable according to one embodiment of the present disclosure.

FIG. 5 is a schematic diagram of a first processing process in a data transmission method when a serving cell is unavailable according to one embodiment of the present disclosure. The first processing process includes the following steps.

201. UE detects that a core serving cell in a serving cell set is unavailable, determines whether all CCells are unavailable, and performs 202 to 204 if an available CCell exists, or perform step 205 if all the CCells are unavailable.

Specifically, when the UE detects that a core serving cell in the serving cell set is unavailable, the UE determines whether all the CCells in the serving cell set are unavailable.

202. The UE sends a core serving cell unavailability message to an access network device.

The core serving cell unavailability message is used to indicate that a first core serving cell is unavailable. Optionally, the core serving cell unavailability message carries a cell identity or an index that is of the first core serving cell and that is used to indicate a failed CCell, and/or a cause value that is for unavailability of the first core serving cell and that is used to indicate a failure cause: for example, an RLF occurs, a quantity of RLC layer retransmissions reaches a maximum value, or the like.

203. The access network device sends a serving cell deletion message to the UE.

In this step, the access network device sends, to the UE, the serving cell deletion message that carries a cell identity, so that the UE deletes a serving cell corresponding to the cell identity.

204. The UE deletes a serving cell.

This step may be performed after step 202. In this case, the UE autonomously deletes an unavailable serving cell after sending the serving cell unavailability message to the access network device. Alternatively, this step may be performed after step 203. In other words, the UE deletes an unavailable serving cell after receiving an instruction from the access network device.

205. The UE initiates a radio resource control RRC connection re-establishment process.

Figure 6:
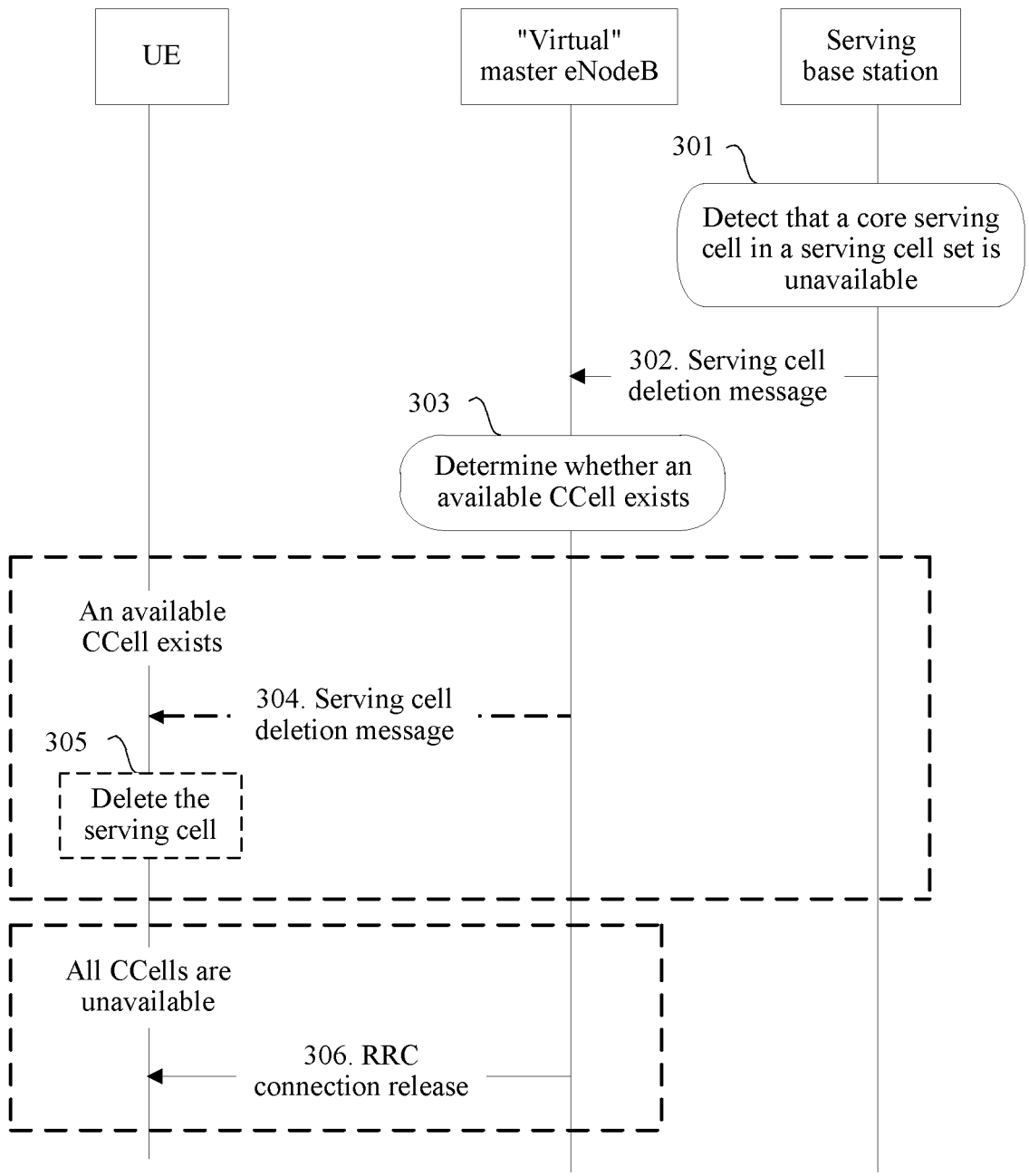
FIG. 6 is a schematic diagram of a second processing process in a data transmission method when a serving cell is unavailable according to one embodiment of the present disclosure.

In addition, the UE can detect whether all the core serving cells in the serving cell set are unavailable, and the access network device may also detect whether each core serving cell in the serving cell set is available. Specifically, referring to FIG. 6, FIG. 6 is a schematic diagram of a second processing process in a data transmission method when a serving cell is unavailable according to one embodiment of the present disclosure. The second processing process includes the following steps.

301. An access network device detects that a core serving cell in a serving cell set is unavailable.

302. The access network device sends a serving cell deletion message to a "virtual" master eNodeB.

In this embodiment of the present disclosure, the "virtual" master eNodeB is also referred to as an RRC anchor, an S1 anchor, a signaling anchor, a RAN control plane anchor, and the like, and is configured to process an RRC message and an S1 message of the UE, namely, data of a signaling radio bearer.

303. The "virtual" master eNodeB determines whether all CCells are unavailable, and performs 304 to 305 if an available CCell exists, or performs step 306 if all the CCells are unavailable.

304. The "virtual" master eNodeB sends the serving cell deletion message to UE.

305. The UE deletes a serving cell.

306. The "virtual" master eNodeB sends an RRC connection release message to the UE.

Finally, the mobility mechanism is described.

In this embodiment of the present disclosure, a handover process is not used for mobility of the UE, and the handover process is replaced by addition or deletion of a CCell. Addition or deletion of a CCell does not affect normal data transmission of another CCell. This avoids data transmission interruption caused by mobility of the UE.

The foregoing first aspect is related to an air interface data transmission mechanism. Dependence of the UE on a PCell, a PSCell, a master eNodeB, and the like is eliminated when the UE transmits air interface data, thereby improving robustness of data transmission and reducing possibility of data transmission interruption.

The second aspect is the network side.

The foregoing first aspect is related to an air interface data transmission mechanism, and the second aspect is related to a data transmission and processing mechanism on the network side. The second aspect of the present disclosure is described in detail below from three aspects: a control plane, a user plane, and mobility.

First, the control plane is described.

For a control plane of an access network, a concept of "virtual" master eNodeB (Virtual MeNB) is introduced. The "virtual" master eNodeB may be an RRC anchor, an S1 anchor, a signaling anchor, a RAN control plane anchor, and the like. These anchors are collectively referred to as a signaling anchor below. The signaling anchor is configured to process an RRC message and an S1 message of the UE, namely, data of a signaling radio bearer. Therefore, it may be considered that the "virtual" master eNodeB is an anchor of all signaling radio bearers. For an access network device, the signaling anchor may be the access network device itself. For example, the signaling anchor is one of serving base stations that provide a service for the UE. In this case, the serving base station includes a cell providing a service for the UE. For example, whether the serving base station is used as a "virtual" master eNodeB when the UE initially accesses the base station is determined, and if the serving base station is not used as the "virtual" master eNodeB, the base station is configured as the "virtual" master eNodeB. In other words, all subsequent RRC messages and S1 messages of the UE are processed by the "virtual" master eNodeB. Alternatively, the signaling anchor is another access network device. For example, the signaling anchor is a base station that does not provide a service for the UE. In this case, the base station does not include a cell that provides a service for the UE. In addition, the signaling anchor may even be a non-base station network element, thereby facilitating signaling anchor setting.

UE in a connected state only has one signaling anchor. In other words, all RRC messages and S1 messages of the UE are processed by the signaling anchor. In addition, regardless of an access network device that receives RRC signaling sent by the UE, the RRC signaling is sent to the signaling anchor for processing, and an MME always sends S1 signaling to the signaling anchor. Specifically, referring to FIG. 7, FIG. 7 is a schematic diagram of a signaling radio bearer and a data radio bearer in a data transmission method according to one embodiment of the present disclosure.

Figure 7:
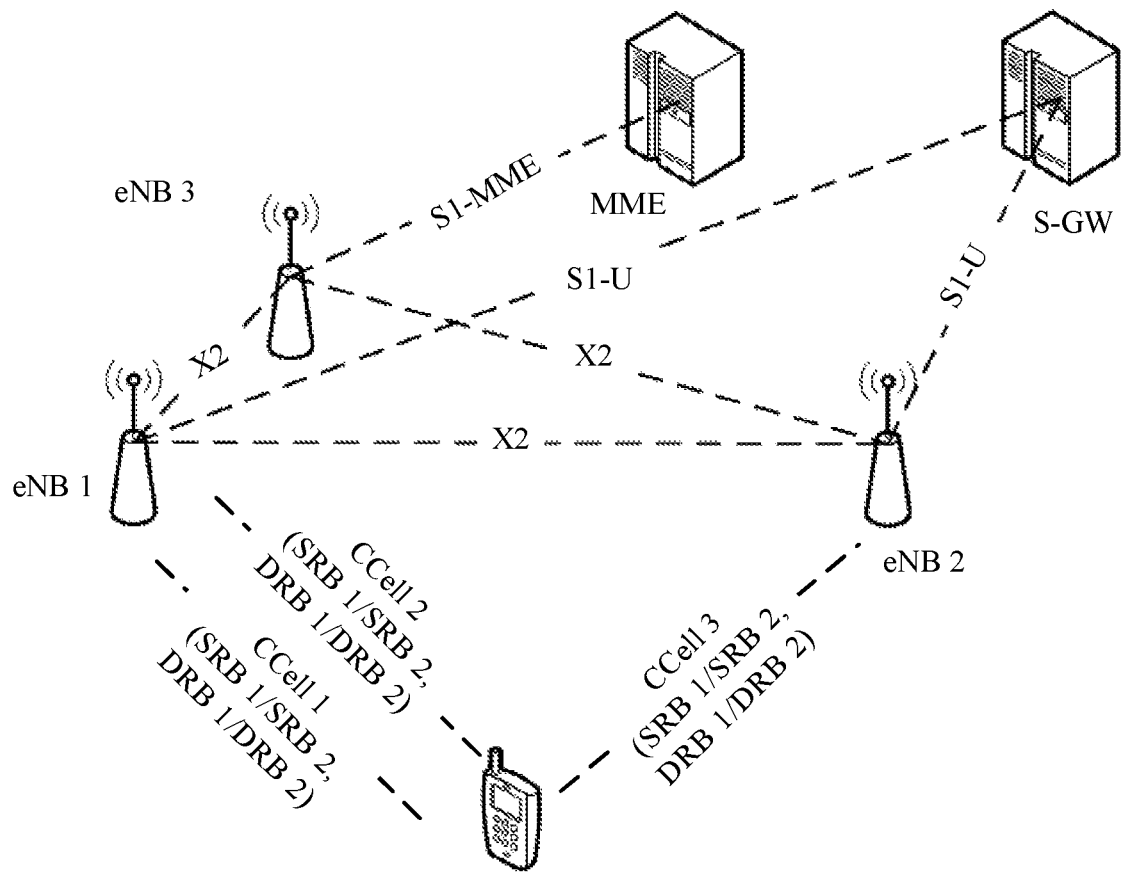
FIG. 7 is a schematic diagram of a signaling radio bearer and a data radio bearer in a data transmission method according to one embodiment of the present disclosure.

Referring to FIG. 7, an eNB1 is a data anchor corresponding to a DRB 1, an eNB2 is a data anchor corresponding to a DRB 2, and an eNB3 includes signaling anchors corresponding to all SRBs, namely, an SRB 1 and an SRB 2.

Second, the user plane is described.

In this embodiment of the present disclosure, a concept of a bearer anchor (bearer anchor), also referred to as a data anchor, is introduced for each DRB. An in-order delivery function of a PDCP layer and a security function of a DRB are processed by a data anchor corresponding to the DRB. This may be understood as that the PDCP layer of the DRB is located in the data anchor corresponding to the DRB. A data anchor of a DRB is a unique uplink egress and a unique downlink egress of the DRB. In other words, all data of the DRB is sent to an upper-layer node (namely, a serving gateway S-GW) and all downlink data of the DRB is received from the S-GW by using the data anchor. In other words, all data of the DRB needs to be aggregated in the data anchor corresponding to the DRB for encryption and in-order delivery.

In an optional implementation, the control plane and the user plane may also be unified, so that all bearers, including a data radio bearer and a signaling radio bearer, are corresponding to one anchor, and all SRBs are corresponding to one signaling anchor, namely, a "virtual" master eNodeB. DRBs may be corresponding to one data anchor or different data anchors.

Figure 8A:
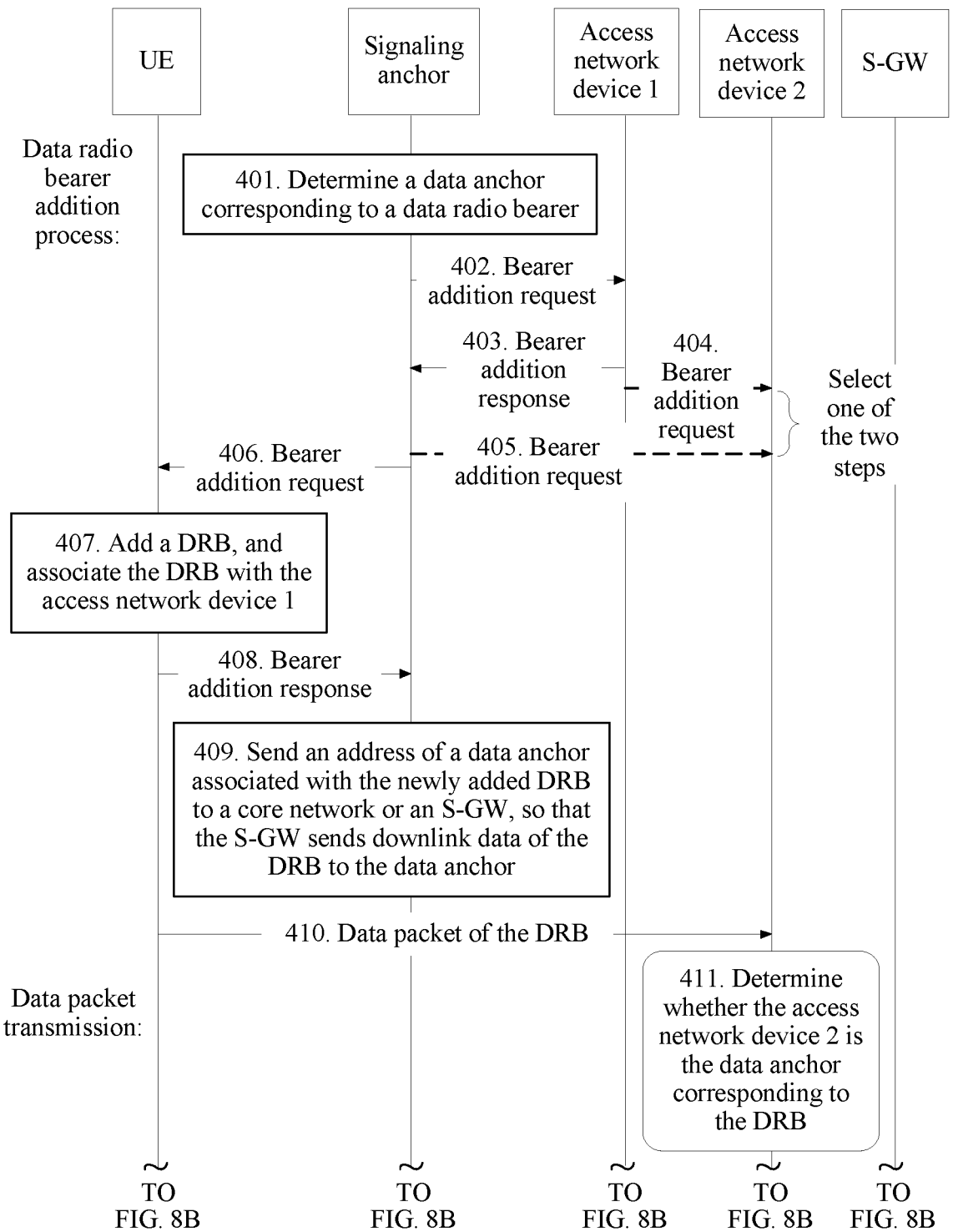
FIG. 8A and FIG. 8B are a signaling diagram of data radio bearer addition and data packet transmission in a data transmission method according to one embodiment of the present disclosure.
Figure 8B:
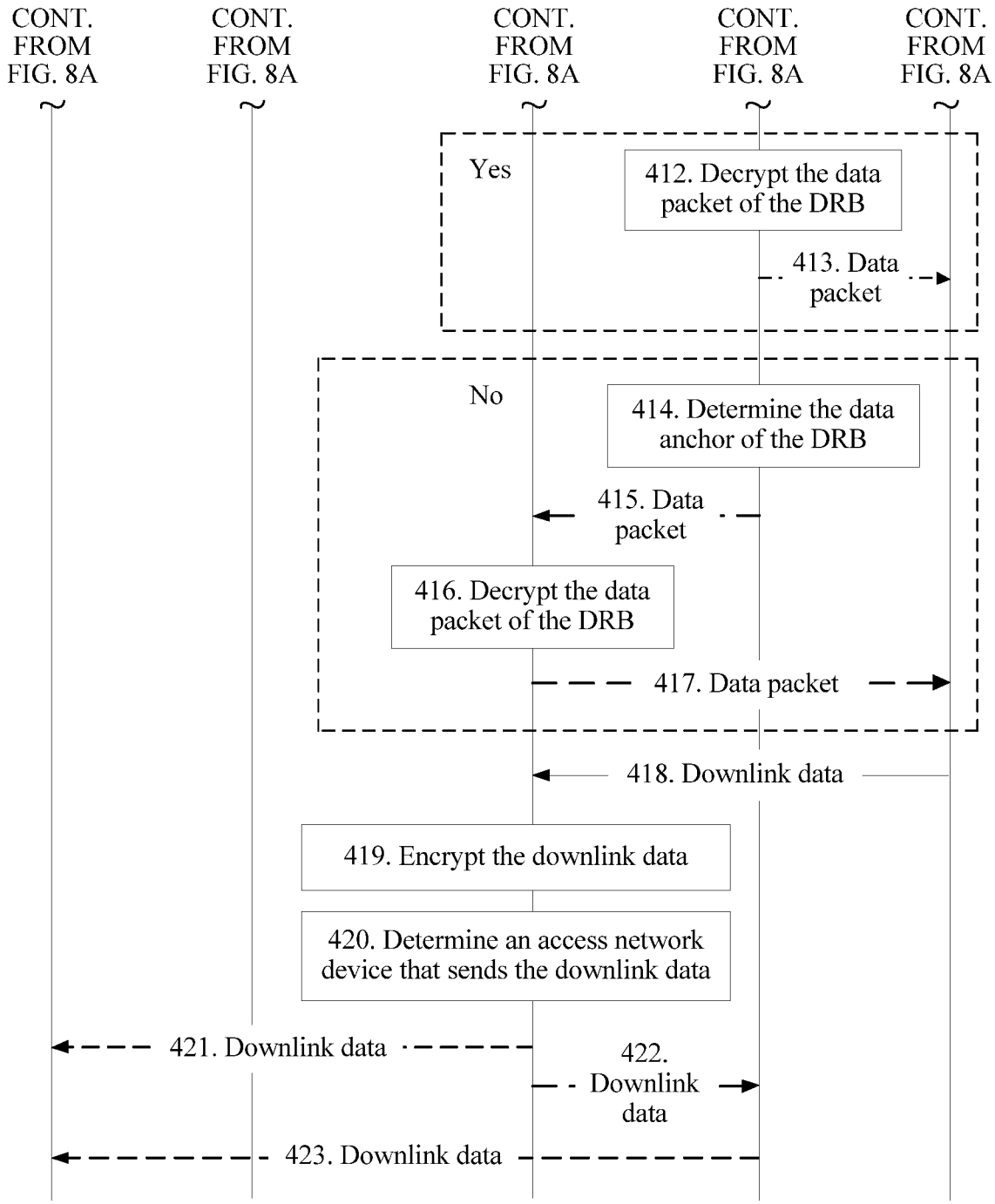

The control plane and data plane are described in detail below from two aspects: data radio bearer addition and data packet transmission. Specifically, referring to FIG. 8A and FIG. 8B, FIG. 8A and FIG. 8B are a signaling diagram of data radio bearer addition and data packet transmission in a data transmission method according to one embodiment of the present disclosure.

401. A signaling anchor determines a data anchor corresponding to a data radio bearer.

In this step, the signaling anchor receives a bearer addition request sent by a core network, and determines that a data anchor of a newly added DRB is an access network device 1.

The signaling anchor determines a data anchor corresponding to each DRB, and different DRBs may be corresponding to one data anchor or different data anchors. Certainly, when the signaling anchor is also an access network device, the signaling anchor may further determine that the signaling anchor is a data anchor corresponding to a DRB.

For one UE, security keys of one data anchor are the same. In other words, security keys used by a plurality of DRBs corresponding to one data anchor are the same. When a data anchor is added, for example, when an access network device is added, and for another example, when a first serving cell serving an access network device is added, a security key of the data anchor is derived by the signaling anchor and is sent to the data anchor. In a preferred embodiment, the security key of the data anchor may be derived based on a security key of the signaling anchor.

402. The signaling anchor sends a bearer addition request to an access network device 1.

The bearer addition request indicates an ID of the newly added DRB, and a data anchor of the DRB is the access network device 1.

In addition, the bearer addition request may further carry another configuration parameter, for example, a quality of service (QoS) parameter of the DRB.

403. The access network device 1 sends a bearer addition response to the signaling anchor.

404. The access network device 1 sends a bearer addition request to an access network device 2.

405. The signaling anchor sends a bearer addition request to the access network device 2.

Step 404 and step 405 are optional steps, and one of the two steps may be selected for being performed. A bearer addition request message indicates the ID of the newly added DRB and information about a data anchor associated with the DRB, so that the access network device 2 can establish a correspondence between the DRB and the data anchor. Preferably, the access network device 1 or the signaling anchor sends a bearer addition request to all serving base stations of the UE, so that all the serving base stations of the UE can establish the correspondence between the DRB and the data anchor, to send, after receiving data of the DRB, the data to the data anchor corresponding to the DRB.

406. The signaling anchor sends a bearer addition request to UE.

When the signaling anchor is also an access network device, the access network device sends, to the UE, a third message that is used to add a DRB, where the third message carries information about a data anchor associated with the DRB. When the data anchor associated with the DRB is the access network device 1, the information about the data anchor may be an ID or an index of the access network device 1.

Optionally, the third message may further carry a security parameter of the data anchor.

Optionally, the third message may further carry information about all serving cells that belong to the data anchor.

407. The UE adds a DRB, and associates the DRB with the access network device 1.

408. The UE sends a bearer addition response message to the signaling anchor.

409. The signaling anchor sends an address of the data anchor associated with the newly added DRB to a core network or an S-GW, so that the S-GW sends downlink data of the DRB to the data anchor.

410. The UE transmits a data packet of a DRB by using any serving cell in a serving cell set.

The serving cell may be a CCell in the serving cell set, or may be a non-CCell in the serving cell set, and certainly, non-CCell needs assistance from a CCell associated with the non-CCell.

Optionally, in step 406, the third message further carries the security parameter of the data anchor, namely, the security parameter of the access network device 1, the UE may further derive the security key of the data anchor based on the security parameter, and perform security processing on a data packet of the DRB by using the security key.

Optionally, in step 406, the third message further carries information about all serving cells that belong to the data anchor, so that the UE may preferentially select these serving cells to send uplink data, so as to reduce data transmission overheads on the network side.

411. The access network device 2 determines whether the access network device 2 is a data anchor corresponding to the DRB.

It is assumed that in step 410, the UE sends uplink data to the access network device 2, and the access network device 2 determines whether the access network device 2 is the data anchor of the DRB, and if the access network device 2 is the data anchor of the DRB, steps 412 and 413 are performed; if the access network device 2 is not the data anchor of the DRB, step 414 is performed.

412. The access network device 2 decrypts the data packet of the DRB.

413. The access network device 2 sends the decrypted data packet of the DRB to the S-GW.

It should be noted herein that the access network device 2 does not send the data packet to the S-GW immediately after the data packet is decrypted. Instead, an in-order delivery function needs to be performed, and the access network device 2 sends the data packet after a rule for in-order delivery is met.

414. The access network device 2 determines a data anchor of the DRB.

In this step, the access network device 2 finds, based on a correspondence between a DRB and a data anchor, the data anchor corresponding to the DRB. For example, it is determined that the data anchor of the DRB is the access network device 1.

415. The access network device 2 sends the data packet of the DRB to the access network device 1.

416. The access network device 1 decrypts the data packet of the DRB.

417. The access network device 1 sends the decrypted data packet of the DRB to the S-GW.

It should be noted herein that the access network device 1 does not send the data packet to the S-GW immediately after the data packet is decrypted. Instead, an in-order delivery function needs to be performed, and the access network device 1 sends the data packet after a rule for in-order delivery is met.

418. The access network device 1 receives downlink data sent by the S-GW.

419. The access network device 1 encrypts the downlink data.

420. The access network device 1 determines an access network device that sends the downlink data, and performs step 421 if it is determined that the access network device 1 sends the downlink data, or performs step 422 if it is determined that the access network device 1 does not send the downlink data.

421. The access network device 1 sends the downlink data to the UE.

422. The access network device 1 sends the downlink data to the access network device 2.

423. The access network device 2 sends the downlink data to the UE.

Finally, the mobility mechanism is described.

Because of the mobility of the UE, an air interface may be added, and/or a serving cell may be deleted, a signaling anchor on the network side may be replaced, and a data anchor of the data radio bearer may be added or updated on the network side. However, the foregoing cases may be completely independent and decoupled. Therefore, the air interface only focuses on providing an available data transmission channel, to reduce impact of mobility on data transmission of the UE. When a current singling anchor determines whether to switch to a new signaling anchor, keys of all data anchors may remain unchanged. That is, keys of nodes are independent of each other and do not affect each other: when a key of one node changes, a key of another may remain unchanged. The signaling anchor may change the data anchor corresponding to the data radio bearer, and send information about a new data anchor corresponding to the data radio bearer to another node, so that the another node updates a correspondence between the data radio bearer and the data anchor. A change of a signaling anchor or a change of a data anchor corresponding to a data radio bearer usually occurs when data transmission path overheads between a current access network device and a signaling anchor or data transmission path overheads between access network devices are relatively large. Theoretically, however, the change may occur at any moment.

The foregoing embodiment shown in FIG. 8A and FIG. 8B mainly describe addition of the DRB bearer and data packet transmission of the DRB. Data packet transmission of an SRB is similar to that of the DRB, except that all signaling radio bearers are corresponding to one signaling anchor. Specifically, before transmitting the air interface data by using the serving cell set, the UE receives a fourth message sent by the access network device, where the fourth message carries information about the signaling anchor, and the UE associates all signaling radio bearers of the UE with the signaling anchor.

Optionally, the fourth message carries a security parameter of the signaling anchor. In this case, the UE derives the security key of the signaling anchor based on the security parameter of the signaling anchor, and the UE processes, by using the security key of the signaling anchor, data packets of all signaling radio bearers of the UE.

The foregoing has described the data transmission method of the present disclosure in detail from the perspective of the UE. For an access network device, in the data transmission method, the access network device receives a data packet that is of a data radio bearer and that is sent by user equipment UE by using any serving cell in a serving cell set; the access network device determines whether the access network device is a data anchor associated with the data radio bearer, and decrypts the data packet and sends the decrypted data packet to a serving gateway if the access network device determines that the access network device is the data anchor associated with the data radio bearer, or determines a data anchor associated with the data radio bearer and sends the data packet to the data anchor if the access network device determines that the access network device is not the data anchor associated with the data radio bearer; and after receiving the data packet, the data anchor decrypts the data packet and sends the decrypted data packet to the serving gateway.

According to the data transmission method provided in this embodiment of the present disclosure, the access network device receives the data packet of the data radio bearer by using any serving cell in the serving cell set, and decrypts the data packet and sends the decrypted data packet to the serving gateway after determining that the access network device is the data anchor of the data radio bearer; or determines the data anchor associated with the data radio bearer and sends the data packet to the data anchor if the access network device determines that the access network device is not the data anchor associated with the data radio bearer. Data transmission is performed by using an available serving cell to the greatest extent. In other words, data transmission can be performed by using any available core serving cell, to reduce the dependence of data transmission between serving cells and minimize possibility of data transmission interruption, thereby improving data transmission robustness.

Optionally, before the access network device determines whether the access network device is the data anchor associated with the data radio bearer, the method further includes: receiving, by the access network device, a fifth message that is sent by a signaling anchor or the data anchor associated with the data radio bearer and that is used to add the data radio bearer, where the fifth message carries information about the data anchor associated with the data radio bearer.

Optionally, the fifth message further carries quality of service (QoS) information of the data radio bearer.

Optionally, if the fifth message is specifically sent by the signaling anchor and the information about the data anchor indicates that the access network device is the data anchor, the fifth message further carries a security key of the data anchor; and the method further includes: processing, by the access network device, the data packet of the data radio bearer by using the security key of the data anchor.

Further, optionally, the security key of the data anchor is derived from a security key of the signaling anchor by the signaling anchor.

Optionally, the receiving, by an access network device, a data packet that is of a data radio bearer and that is sent by user equipment UE by using any serving cell in a serving cell set includes:

determining, by the access network device, that the security key of the signaling anchor changes; and receiving, by the access network device by further using the security key of the data anchor, the data packet that is of the data radio bearer and that is sent by the user equipment UE by using any serving cell in the serving cell set.

In this embodiment, because the access network device does not know that the key of the signaling anchor changes, original security key information is further used to transmit data with the UE. In other words, the signaling anchor generates the security key of the data anchor based on the current security key of the signaling anchor and sends the security key to the data anchor; and after the security key of the signaling anchor changes, the security key of the data anchor may not be updated.

Optionally, the method further includes: receiving, by the access network device, a data packet that is of a signaling radio bearer and that is sent by the UE by using any serving cell in the serving cell set;

determining, by the access network device, whether the access network device is a signaling anchor; and decrypting the data packet and processing a radio resource control RRC message in the data packet if the access network device determines that the access network device is the signaling anchor; or sending the data packet to the signaling anchor if the access network device determines that the access network device is not the signaling anchor.

Figure 9:
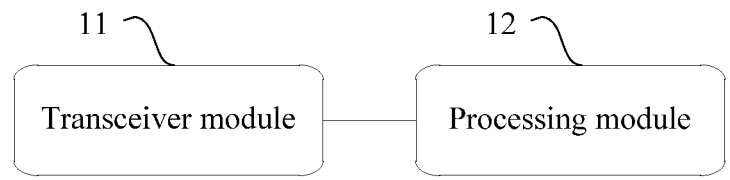
FIG. 9 is a schematic structural diagram of user equipment according to one embodiment of the present disclosure.

FIG. 9 is a schematic structural diagram of user equipment according to one embodiment of the present disclosure. The user equipment provided in this embodiment may implement steps of a method that is applied to the user equipment and that is provided in any embodiment of the present disclosure. Specifically, the user equipment provided in this embodiment includes:

a transceiver module 11, configured to transmit air interface data by using a serving cell set, where the serving cell set includes at least two core serving cells, and the core serving cell is a cell configured to independently serve the UE to transmit the air interface data.

The transceiver module 11 is further configured to initiate a radio resource control RRC connection re-establishment process when all core serving cells in the serving cell set are unavailable.

The user equipment provided in this embodiment of the present disclosure transmits the air interface data to the access network device by using the serving cell set including the at least two core serving cells that can independently serve the UE to transmit data, and initiates the RRC connection re-establishment process to the access network device only when detecting that all the core serving cells in the serving cell set are unavailable. Data transmission is performed by using an available serving cell to the greatest extent. In other words, data transmission can be performed by using any available core serving cell, to reduce the dependence of data transmission between serving cells and minimize possibility of data transmission interruption, thereby improving data transmission robustness.

Optionally, the serving cell set is provided by at least one access network device.

Further referring to FIG. 9, the user equipment provided in this embodiment of the present disclosure further includes a processing module 12.

The transceiver module 11 is configured to receive a first message that is sent by an access network device and that is used to add a first cell as a core serving cell; and the processing module 12 is configured to add the first cell to the serving cell set.

Optionally, the first message carries first indication information, and the first indication information is used to indicate that the first cell is a core serving cell; or the first message carries a core serving cell parameter.

Optionally, the core serving cell parameter includes physical uplink control channel (PUCCH) configuration information.

Optionally, the transceiver module 11 is further configured to send a core serving cell unavailability message to the access network device when the first core serving cell in the serving cell set is unavailable, where the core serving cell unavailability message is used to indicate that the first core serving cell is unavailable; and that the first core serving cell is unavailable includes the following cases:

a radio link failure (RLF) occurs in the first core serving cell; or a quantity of radio link control (RLC) retransmissions of the first core serving cell reaches a maximum value.

Optionally, the core serving cell unavailability message carries a cell identity of the first core serving cell and/or a cause value for unavailability of the first core serving cell.

Optionally, the transceiver module 11 is further configured to receive a second message that is sent by an access network device and that is used to add a second cell as a non-core serving cell, where the second message carries a cell identity of a second core serving cell in the serving cell set, and is used to instruct to associate the second cell with the second core serving cell; and the processing module 12 is configured to add the second cell as a non-core serving cell, and associate the second cell with the second core serving cell.

Figure 10:
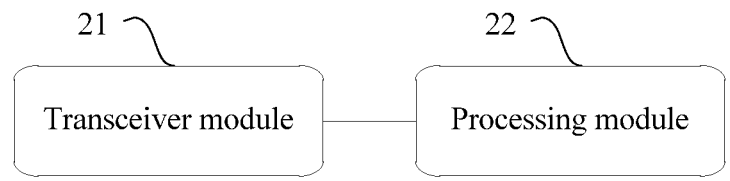
FIG. 10 is a schematic structural diagram of an access network device according to one embodiment of the present disclosure.

FIG. 10 is a schematic structural diagram of an access network device according to one embodiment of the present disclosure. The access network device provided in this embodiment may implement steps of a method that is applied to the access network device and that is provided in any embodiment of the present disclosure. Specifically, the access network device provided in this embodiment includes:

a transceiver module 21, configured to receive a data packet that is of a data radio bearer and that is sent by user equipment UE by using any serving cell in a serving cell set; and a processing module 22, configured to: determine whether the access network device is a data anchor associated with the data radio bearer; and decrypt the data packet and send the decrypted data to a serving gateway if it is determined that the access network device is the data anchor associated with the data radio bearer; or determine a data anchor associated with the data radio bearer and send the data packet to the data anchor if it is determined that the access network device is not the data anchor associated with the data radio bearer.

The access network device provided in this embodiment of the present disclosure receives the data packet of the data radio bearer by using any serving cell in the serving cell set, and decrypts the data packet and sends the decrypted data packet to the serving gateway after determining that the access network device is the data anchor of the data radio bearer; or determines the data anchor associated with the data radio bearer and sends the data packet to the data anchor if the access network device determines that the access network device is not the data anchor associated with the data radio bearer. Data transmission is performed by using an available serving cell to the greatest extent. In other words, data transmission can be performed by using any available core serving cell, to reduce the dependence of data transmission between serving cells and minimize possibility of data transmission interruption, thereby improving data transmission robustness.

Optionally, before the processing module 22 determines whether the processing module 22 is the data anchor associated with the data radio bearer, the transceiver module 21 is further configured to receive a fifth message that is sent by a signaling anchor or the data anchor associated with the data radio bearer and that is used to add the data radio bearer, where the fifth message carries information about the data anchor associated with the data radio bearer.

Optionally, the fifth message further carries quality of service (QoS) information of the data radio bearer.

Optionally, if the fifth message is specifically sent by the signaling anchor and the information about the data anchor indicates that the access network device is the data anchor, the fifth message further carries a security key of the data anchor; and the processing module 22 is further configured to process the data packet of the data radio bearer by using the security key of the data anchor.

Optionally, the security key of the data anchor is derived from a security key of the signaling anchor by the signaling anchor.

Optionally, the transceiver module 21 is specifically configured to: when the security key of the signaling anchor changes, perform data transmission with the UE by still using security key information of the data anchor.

Optionally, the transceiver module 21 is further configured to receive a data packet that is of a signaling radio bearer and that is sent by the UE by using any serving cell in the serving cell set; and the processing module 22 is further configured to: determine whether processing module 22 is a signaling anchor; and decrypt the data packet and process a radio resource control RRC message in the data packet if it is determined that the processing module 22 is the signaling anchor; or send the data packet to the signaling anchor if it is determined that the access network device is not the signaling anchor.

Figure 11:
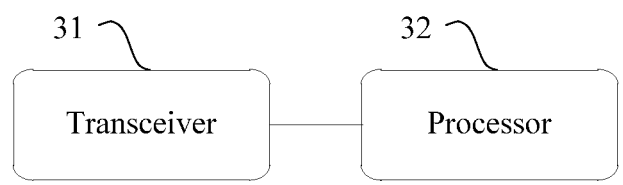
FIG. 11 is a schematic structural diagram of user equipment according to one embodiment of the present disclosure.

FIG. 11 is a schematic structural diagram of user equipment according to one embodiment of the present disclosure. The user equipment provided in this embodiment may implement steps of a method that is applied to the user equipment and that is provided in any embodiment of the present disclosure. Specifically, the user equipment provided in this embodiment includes:

a transceiver 31, configured to transmit air interface data by using a serving cell set, where the serving cell set includes at least two core serving cells, and the core serving cell is a cell configured to independently serve the UE to transmit the air interface data.

The transceiver 31 is further configured to initiate a radio resource control RRC connection re-establishment process when all core serving cells in the serving cell set are unavailable.

The user equipment provided in this embodiment of the present disclosure transmits the air interface data to the access network device by using the serving cell set including the at least two core serving cells that can independently serve the UE to transmit data, and initiates the RRC connection re-establishment process to the access network device only when detecting that all the core serving cells in the serving cell set are unavailable. Data transmission is performed by using an available serving cell to the greatest extent. In other words, data transmission can be performed by using any available core serving cell, to reduce the dependence of data transmission between serving cells and minimize possibility of data transmission interruption, thereby improving data transmission robustness.

Optionally, the serving cell set is provided by at least one access network device.

Further referring to FIG. 11, the user equipment provided in this embodiment of the present disclosure further includes a processor 32; where the transceiver 31 is configured to receive a first message that is sent by an access network device and that is used to add a first cell as a core serving cell; and the processor 32 is configured to add the first cell to the serving cell set.

Optionally, the first message carries first indication information, and the first indication information is used to indicate that the first cell is a core serving cell; or the first message carries a core serving cell parameter.

Optionally, the core serving cell parameter includes physical uplink control channel (PUCCH) configuration information.

Optionally, the transceiver 31 is further configured to send a core serving cell unavailability message to the access network device when the first core serving cell in the serving cell set is unavailable, where the core serving cell unavailability message is used to indicate that the first core serving cell is unavailable; and that the first core serving cell is unavailable includes the following cases:

a radio link failure (RLF) occurs in the first core serving cell; or a quantity of radio link control (RLC) retransmissions of the first core serving cell reaches a maximum value.

Optionally, the core serving cell unavailability message carries a cell identity of the first core serving cell and/or a cause value for unavailability of the first core serving cell.

Optionally, the transceiver 31 is further configured to receive a second message that is sent by an access network device and that is used to add a second cell as a non-core serving cell, where the second message carries a cell identity of a second core serving cell in the serving cell set, and is used to instruct to associate the second cell with the second core serving cell; and the processor 32 is configured to add the second cell as a non-core serving cell, and associate the second cell with the second core serving cell.

Figure 12:
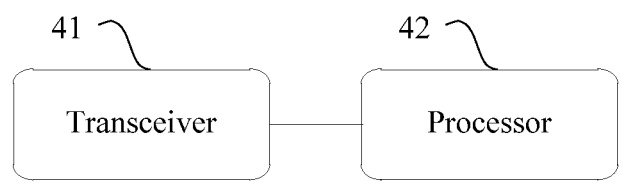
FIG. 12 is a schematic structural diagram of an access network device according to one embodiment of the present disclosure.

FIG. 12 is a schematic structural diagram of an access network device according to one embodiment of the present disclosure. The access network device provided in this embodiment may implement steps of a method that is applied to the access network device and that is provided in any embodiment of the present disclosure. Specifically, the access network device provided in this embodiment includes:

a transceiver 41, configured to receive a data packet that is of a data radio bearer and that is sent by user equipment UE by using any serving cell in a serving cell set; and a processor 42, configured to: determine whether the access network device is a data anchor associated with the data radio bearer; and decrypt the data packet and send the decrypted data to a serving gateway if it is determined that the access network device is the data anchor associated with the data radio bearer; or determine a data anchor associated with the data radio bearer and send the data packet to the data anchor if it is determined that the access network device is not the data anchor associated with the data radio bearer.

The access network device provided in this embodiment of the present disclosure receives the data packet of the data radio bearer by using any serving cell in the serving cell set, and decrypts the data packet and sends the decrypted data packet to the serving gateway after determining that the access network device is the data anchor of the data radio bearer; or determines the data anchor associated with the data radio bearer and sends the data packet to the data anchor if the access network device determines that the access network device is not the data anchor associated with the data radio bearer. Data transmission is performed by using an available serving cell to the greatest extent. In other words, data transmission can be performed by using any available core serving cell, to reduce the dependence of data transmission between serving cells and minimize possibility of data transmission interruption, thereby improving data transmission robustness.

Optionally, before the processor 42 determines whether the processor 42 is the data anchor associated with the data radio bearer, the transceiver 41 is further configured to receive a fifth message that is sent by a signaling anchor or the data anchor associated with the data radio bearer and that is used to add the data radio bearer, where the fifth message carries information about the data anchor associated with the data radio bearer.

Optionally, the fifth message further carries quality of service (QoS) information of the data radio bearer.

Optionally, if the fifth message is specifically sent by the signaling anchor and the information about the data anchor indicates that the access network device is the data anchor, the fifth message further carries a security key of the data anchor; and the processor 42 is further configured to process a data packet of the data radio bearer by using the security key of the data anchor.

Optionally, the security key of the data anchor is derived from a security key of the signaling anchor by the signaling anchor.

Optionally, the transceiver 41 is specifically configured to: when the security key of the signaling anchor changes, perform data transmission with the UE by still using security key information of the data anchor.

Optionally, the transceiver 41 is further configured to receive a data packet that is of a signaling radio bearer and that is sent by the UE by using any serving cell in the serving cell set; and the processor 42 is further configured to: determine whether the processor 42 is a signaling anchor; and decrypt the data packet and process a radio resource control RRC message in the data packet if it is determined that the processor 42 is the signaling anchor; or send the data packet to the signaling anchor if it is determined that the access network device is not the signaling anchor.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A data transmission method, comprising:
   transmitting, by user equipment (UE), air interface data by using a serving cell set, wherein the serving cell set comprises at least two core serving cells, and each of the core serving cells is a cell configured to independently serve the UE to transmit the air interface data without assistance from any other serving cell; and
   initiating, by the UE, a radio resource control (RRC) connection re-establishment process when none of the core serving cells in the serving cell set is available.

2. The method according to claim 1, wherein the serving cell set is provided by at least one access network device.

3. The method according to claim 1, further comprising:
   receiving, by the UE, a first message that is sent by an access network device and that is used to add a first cell as a core serving cell; and
   adding, by the UE, the first cell to the serving cell set.

4. The method according to claim 3, wherein:
   the first message carries first indication information, and the first indication information is used to indicate that the first cell is a core serving cell; or
   the first message carries a core serving cell parameter.

5. The method according to claim 4, wherein:
   the core serving cell parameter comprises physical uplink control channel (PUCCH) configuration information.

6. The method according to claim 1, further comprising:
   sending, by the UE, a core serving cell unavailability message to the access network device when the first core serving cell in the serving cell set is unavailable, wherein the core serving cell unavailability message is used to indicate that the first core serving cell is unavailable; and
   that the first core serving cell is unavailable comprises the following cases:
   a radio link failure (RLF) occurs in the first core serving cell; or
   a quantity of radio link control (RLC) retransmissions of the first core serving cell reaches a maximum value.

7. The method according to claim 6, wherein:
   the core serving cell unavailability message carries a cell identity of the first core serving cell and/or a cause value for unavailability of the first core serving cell.

8. The method according to claim 1, further comprising:
receiving, by the UE, a second message that is sent by an access network device and that is used to add a second cell as a non-core serving cell, wherein the second message carries a cell identity of a second core serving cell in the serving cell set, and is used to instruct to associate the second cell with the second core serving cell; and adding, by the UE, the second cell as a non-core serving cell, and associating the second cell with the second core serving cell.

9. A user equipment device, comprising:
a transceiver, configured to transmit air interface data by using a serving cell set, wherein the serving cell set comprises at least two core serving cells, and each of the core serving cells is a cell configured to independently serve the UE to transmit the air interface data without assistance from any other serving cell; and the transceiver is further configured to initiate a radio resource control (RRC) connection re-establishment process when none of the core serving cells in the serving cell set is available.

10. The device according to claim 9, wherein the serving cell set is provided by at least one access network device.

11. The device according to claim 9, further comprising a processor; wherein:
the transceiver is configured to receive a first message that is sent by an access network device and that is used to add a first cell as a core serving cell; and the processor is configured to add the first cell to the serving cell set.

12. The device according to claim 11, wherein:
the first message carries first indication information, and the first indication information is used to indicate that the first cell is a core serving cell; or the first message carries a core serving cell parameter.

13. The device according to claim 12, wherein:
the core serving cell parameter comprises physical uplink control channel (PUCCH) configuration information.

14. The device according to claim 9, wherein:
the transceiver is further configured to send a core serving cell unavailability message to the access network device when the first core serving cell in the serving cell set is unavailable, wherein the core serving cell unavailability message is used to indicate that the first core serving cell is unavailable; and that the first core serving cell is unavailable comprises the following cases:

a radio link failure (RLF) occurs in the first core serving cell; or a quantity of radio link control (RLC) retransmissions of the first core serving cell reaches a maximum value.

15. The device according to claim 14, wherein:
the core serving cell unavailability message carries a cell identity of the first core serving cell and/or a cause value for unavailability of the first core serving cell.

16. The device according to claim 9, further comprising a processor, wherein:
the transceiver is further configured to receive a second message that is sent by an access network device and that is used to add a second cell as a non-core serving cell, wherein the second message carries a cell identity of a second core serving cell in the serving cell set, and is used to instruct to associate the second cell with the second core serving cell; and the processor is configured to add the second cell as a non-core serving cell, and associate the second cell with the second core serving cell.

* * * * *